Nov. 28, 1967 SHIGERU MATSUOKA ET AL 3,354,612
APPARATUS FOR AUTOMATICALLY WRAPPING RAYON CAKES
Filed Dec. 23, 1964 6 Sheets-Sheet 1

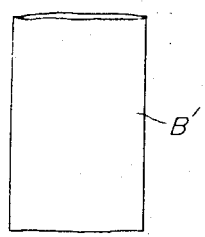
Fig. 4A
Fig. 4B
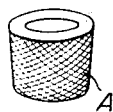
Fig. 4C
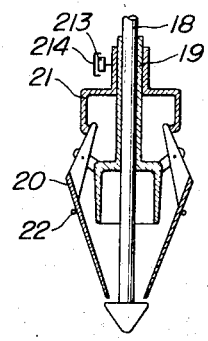
Fig. 9A
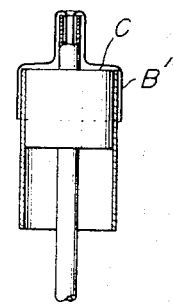
Fig. 5
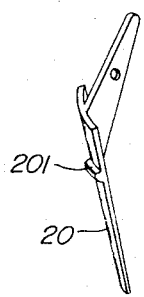
Fig. 6
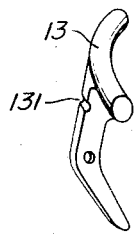
Fig. 7
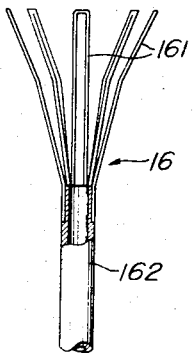
Fig. 8
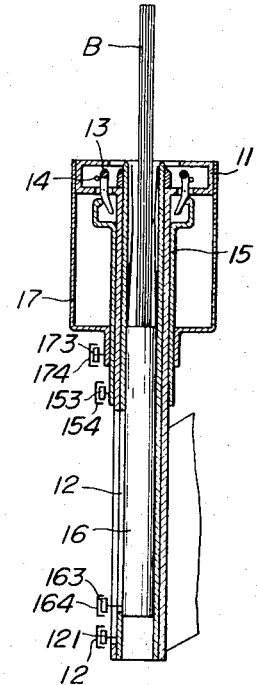

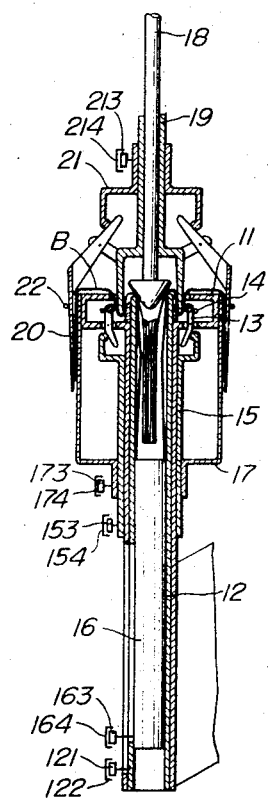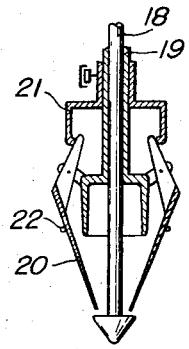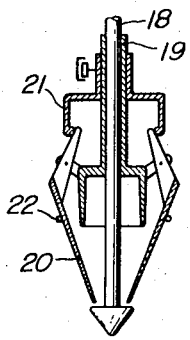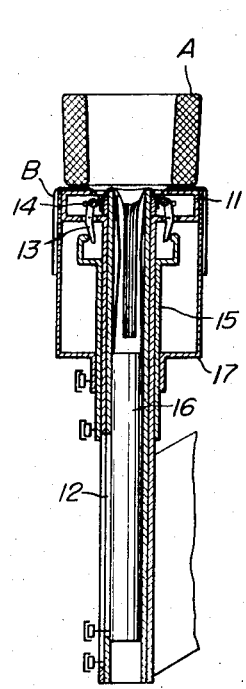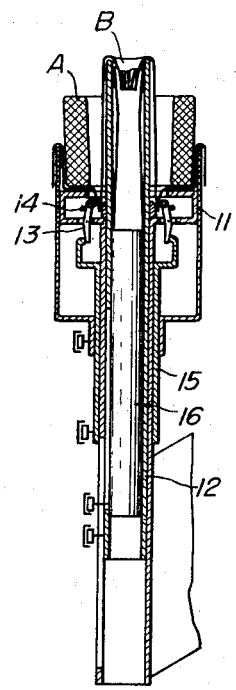

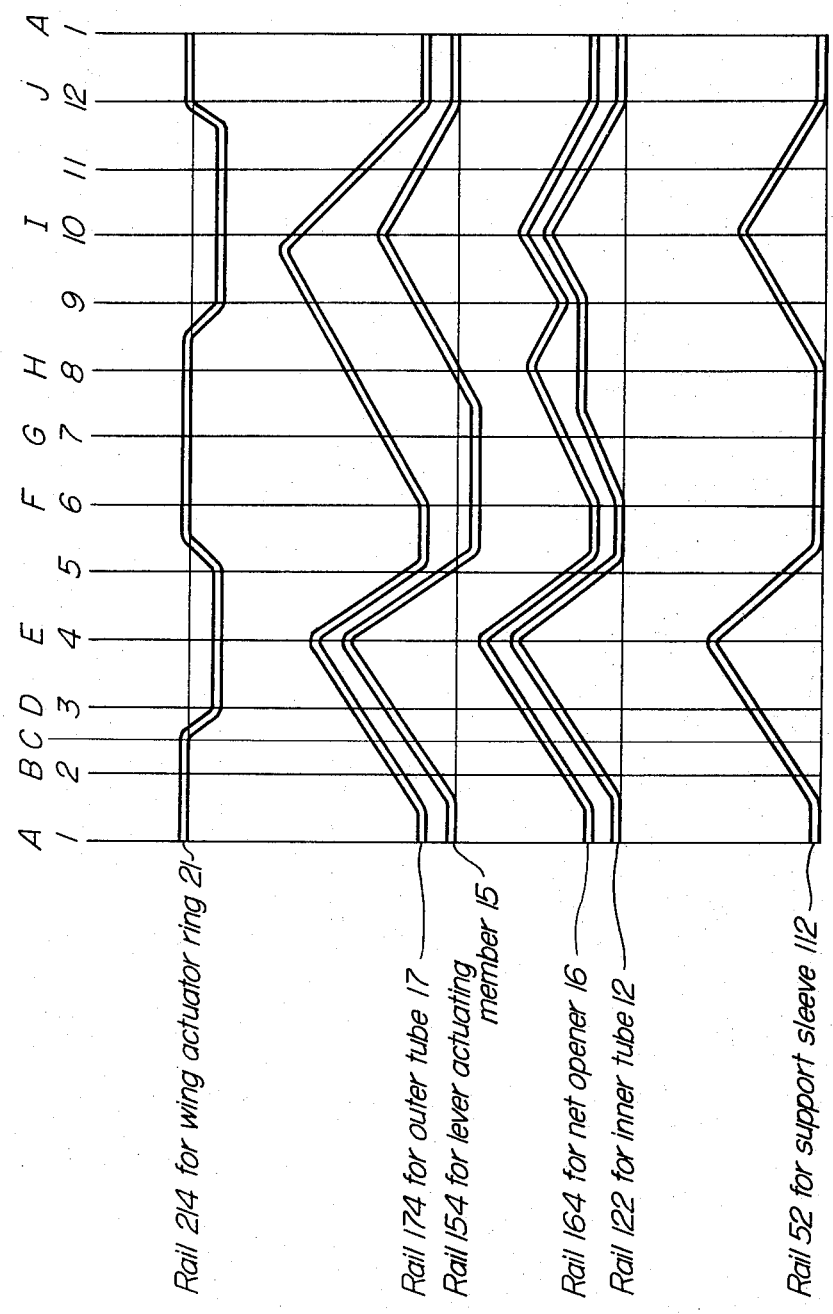

United States Patent Office 3,354,612
Patented Nov. 28, 1967

3,354,612
APPARATUS FOR AUTOMATICALLY WRAPPING RAYON CAKES
Shigeru Matsuoka, Shohachi Masai, and Shigemitsu Kawakami, Nobeoka-shi, Japan, assignors to Asahi, Kasei Kogyo Kabushiki Kaisha, Kita-ku, Osaka, Japan, a corporation of Japan
Filed Dec. 23, 1964, Ser. No. 420,571
Claims priority, application Japan, Dec. 30, 1963, 38/71,659
3 Claims. (Cl. 53—204)

ABSTRACT OF THE DISCLOSURE

A wrapping unit in which a cylindrical net projecting upwardly from an inner tube in a lower head is penetrated by a pivotal wing assembly on an upper head, the wing assembly pivotably moving outwards to expand the projecting end portion of the net, the heads moving towards one another such that the expanded portion of the net is folded down over an outer tube on the lower head while a portion of the net is clamped between a friction ring on the inner tube and a number of clamping levers pivotably mounted on a cake support slidably mounted on the inner tube, the outer tube being raisable around a cake on the cake support to lift the folded over portion of the net and position it around the cake, the inner tube being raisable within the hollow of the cake to lift the other end portion of the net through the cake and turn it inside out after which a net opener rod in the inner tube expands the other end portion of the net and permits introduction of the inwardly pivoted wing assembly therein which then expands the end of the net enabling it to be folded down and over the already folded portion when the heads are moved towards one another.

---

This invention relates to apparatus for automatically wrapping rayon cakes with corrugated nets.

As is well known, cakes of viscose rayon filaments, which are spun by a centrifugal method, are of hollow cylindrical form and are inherently liable to break or collapse in their handling. Because of this, it is a common practice to wrap each of such cakes with a tubular paper or a fabric net for the protection against damage to the filaments otherwise possibly occurring in the successing stages of operation including purification and drying and during transportation between such operation stages. Such cake protection is also required when finished yarns are shipped to customers.

In the past, the cake wrapping operation has been principally manual because both cakes and wrapping nets are characteristically soft and frail and particularly the former are susceptible to thread derangement and damage making it necessary to handle them carefully by a complicated procedure. Various proposals have, of course, been made to mechanize the wrapping operation but up to the present none of them have been put into practice with any success.

The present invention has for its object to provide an apparatus for automatically wrapping rayon cakes with corrugated nets which is operable in a continuous manner and is highly efficient eliminating any difficulties encountered in previously proposed mechanical procedures.

Another object of the present invention is to provide an apparatus of the character described which includes a simple wrapping mechanism and is fully capable of wrapping rayon cakes uniformly, easily and accurately with the presence of a machine operator alone. The apparatus of the present invention has a basic feature that it relies upon a series of coordinated vertical movements of respective parts for its wrapping operation.

These and other objects, features and advantages of the invention will become apparent from the following description when taken in conjunction with the accompanying drawings, which illustrate one preferred embodiment of the invention and in which:

FIG. 4A illustrates a conventional wrapping net;

FIG. 4B illustrates a corrugated wrapping net usable in the present invention; FIG. 4C is a perspective of a rayon cake;

FIG. 5 illustrates the preparatory stage of the conventional manual wrapping operation preceding the stage of cake feed;

FIG. 6 is a fragmentary diagrammatic perspective of one of the wing plates;

FIG. 7 is a view similar to FIG. 6 of one of the clamp levers;

FIG. 8 is a detached front view, partly in section, of the net opener;

Figure 1:
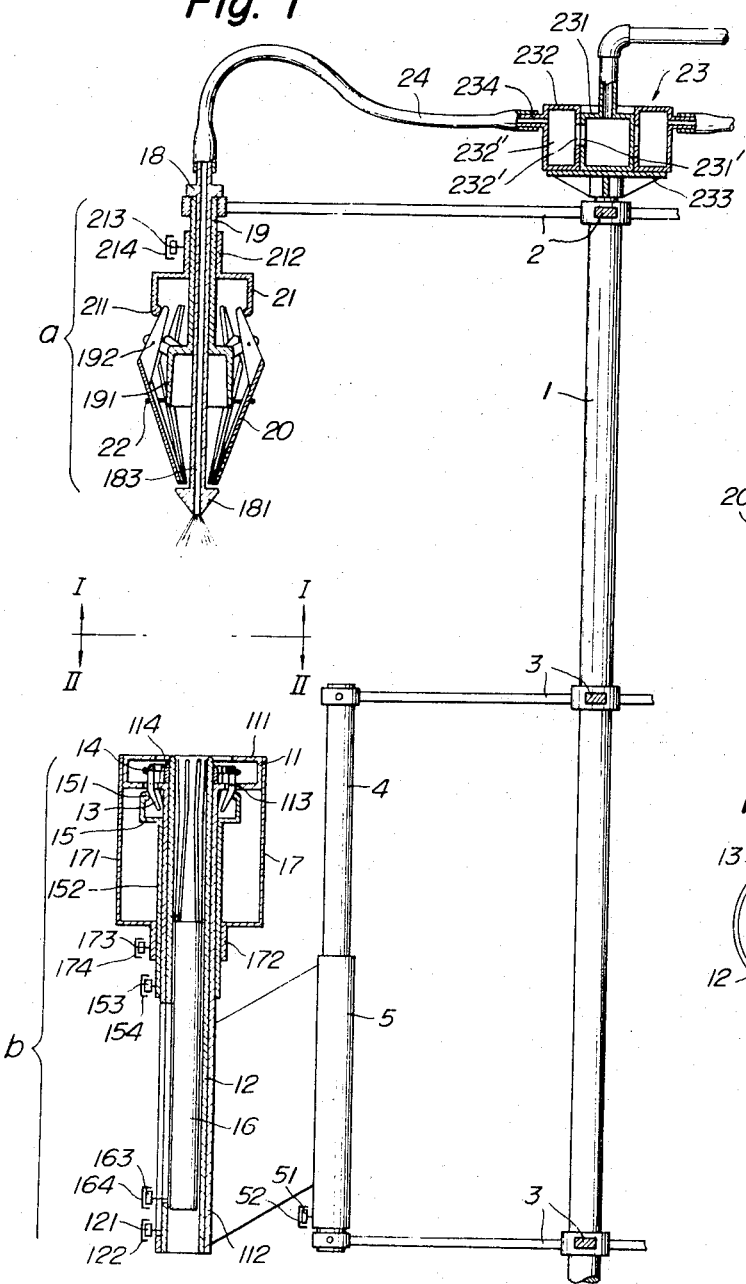
FIG. 1 is a side elevation of the embodiment illustrating one wrapping unit thereof in cross section.
Figure 2:
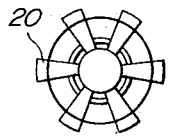
FIG. 2 is a bottom view of the upper head of the unit looking upwardly in the direction of the arrows I—I in FIG. 1.
Figure 3:
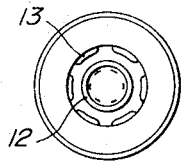
FIG. 3 is a top plan view of the lower head looking downwardly in the direction of the arrows II—II in FIG. 1.
Figure 9B:
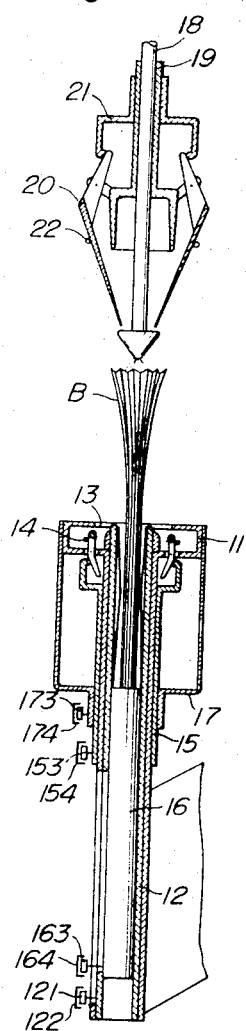
Figure 9C:
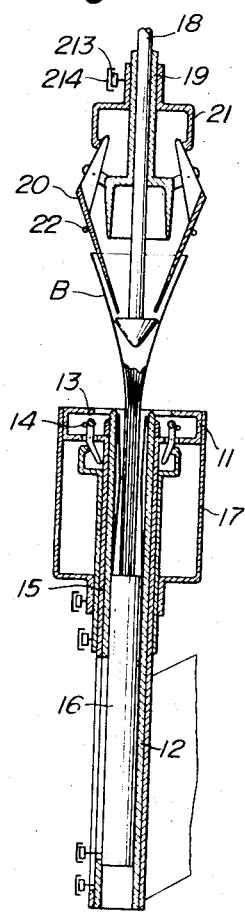
Figure 9D:
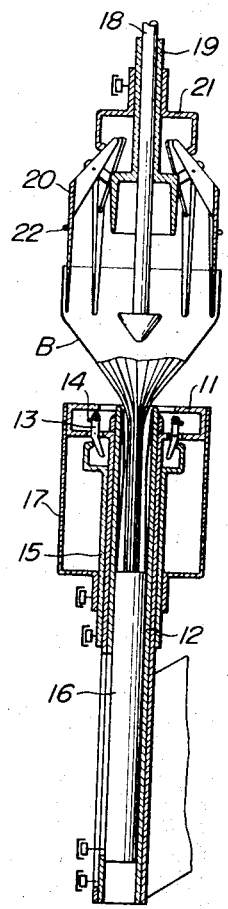
Figure 9H:
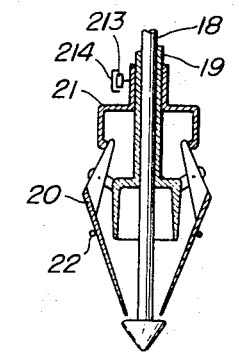
Figure 9H:
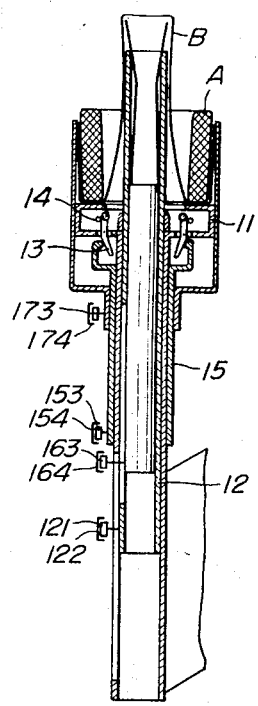
Figure 9I:
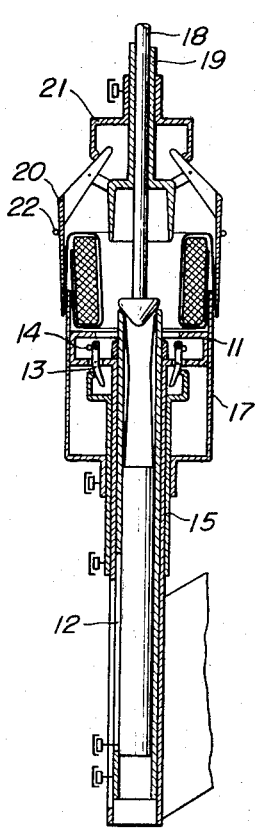
Figure 9J:
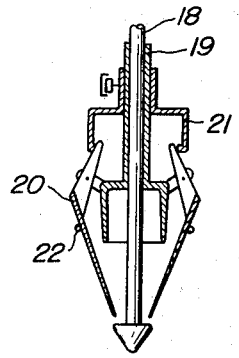
Figure 9J:
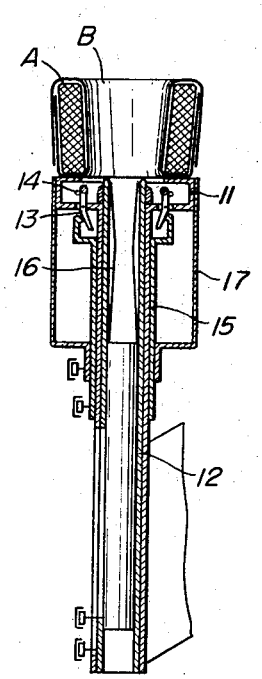

FIGS. 9A to 9J are cross-sectional front elevations of one of the wrapping units illustrating successive operation stages; FIG. 9A illustrating the unit after the insertion of a corrugated net; FIG. 9B showing the net pushed up and opened at the top; FIG. 9C showing the wing assembly covered by the net; FIG. 9D showing the net with its upper half portion fully opened; FIG. 9E showing the unit with the net covering the outer tube or casing preparatory to the cake feed; FIG. 9F showing a cake fed on the unit; FIG. 9G illustrating the stage where the net is folded up to cover the lower half of the cake; FIG. 9H illustrating the net opened by the net opener to wrap the upper half of the cake; FIG. 9I showing the unit immediately after the net has wrapped the upper half of the cake; FIG. 9J showing the cake after it has been wrapped up and before it is discharged from the unit; and FIG. 10 is a diagrammatic view showing a development of guide rails for the wrapping unit.

Referring to the drawings and particularly to FIGS. 1, 2, 3 and 9A to 9J, the wrapping units are arranged about a main drive shaft 1 and each includes an upper and a lower head $a$ and $b$ vertically aligned with each other and carried by respective support arms 2 and 3 extending from the main shaft 1. Carried by the wrapping heads are rollers 51, 121, 153, 163, 173 and 213 which are slidably fitted in respective guide rails 52, 122, 154, 164, 174 and 214 to run therealong when the main shaft 1 is rotated at a predetermined speed. These rollers serve to impart different vertical movements to the associated components of the upper and lower heads $a$ and $b$ to cause the unit to perform the wrapping operation on a cake fed thereto.

In practice, preferably a multiplicity of such wrapping units are arranged circumferentially at regular intervals about a drive shaft, as illustrated in the drawings, so that cakes may be wrapped successively at high speed. The number of the wrapping units in such wrapping machine and the travelling speed of the units turning about the drive shaft are determined according to the cake wrapping capacity required of the machine.

Conventionally, a tubular net B' usually supplied in a flat folded state as shown in FIG. 4A is first opened into a cylindrical form by use of both hands and then manually fitted over a shouldered cylindrical stock C (FIG. 5) preparatory to the cake wrapping operation. However, the manual operation to fit the net over such stock C has accounted for the major proportion of the substantial labor time required for the entire cake wrapping operation. To save the labor time and simplify the preparatory operation, the present invention proposes to use corrugated nets B for wrapping rayon cakes. They are preferably made by corrugating tubular nets commonly available in flat-folded form into tubes having a star-like cross-sectional form. It has been impossible to handle nets B′ of conventional form by means other than manual because of their characteristic shape and limited rigidity. In contrast, wrapping nets shaped with corrugations as described above are stiff, rigid and of a slender cylindrical form having a reduced diameter and parallel axially extending furrows. Such wrapping nets not only facilitate their mechanical handling but have an advantage that they can be expanded or contracted uniformly. Such corrugation of the nets may be performed with ease by any suitable mechanical device known to the art.

The wrapping unit of the present invention will next be described in further detail with reference to FIGS. 1, 2, 3, 6, 7, 8 and 9A to 9J.

An inner tube 12 in the lower head b of the unit is cylindrical having an inner diameter such as to allow a corrugated net B to be easily inserted therein. A friction ring 114 is mounted on the top portion of the inner tube and is made of a material having a substantial coefficient of friction. The fricton ring 114 has an outer diameter such as to allow a pusher ring 191 on head a to pass thereover. The friction ring 114 is fixed to a cake support 11.

Several clamp levers 13 are arranged in a radial configuration about the inner tube 12 and each is pivoted to the support 11 by means of a pin 113. The levers 13 each have the form of a bell crank lever, as shown in FIG. 7. The upper arm of the lever 13 has an arcuate top to encircle the friction ring 114 and an external recess 131 to receive a clamping ring 14, which normally urges the clamp lever 13 radially inwardly against the friction ring 114. The lower arm of the lever 13 is engaged by the top of a tubular lever actuating member 15 formed at the top with a slide ring 151 which is slidable along the outer edge of the lever 13. The lower cylindrical portion 152 of the lever actuating member 15 is axially slidably fitted over a tubular support sleeve 112 which extends downwardly from the cake support 11. The roller 153 is mounted on the outside of the lever actuating member 15 to run along guide rail 154, which has an appropriate sloped form as shown in FIG. 10.

When the lever actuating member 15 is at its upper dead center, the clamp levers 13 have their lower ends pressed against the support sleeve 112 by the slide ring 151 formed at the top of the member 15 and their top portions are held radially outward of the friction ring 114 forming an annular clearance therebetween so that the wrapping net B can be readily pushed therein by the pusher ring 191 arranged in the upper head a. On the other hand, when the lever actuating member reaches its lower dead center position, the lower ends of the clamp levers 13 are released therefrom to allow their top ends to be moved radially inwardly under the action of the clamping ring 14 so that the wrapping net B is clamped between the levers 13 and the friction ring 114. It will be apparent that as the lever actuating member 15 is raised from its bottom dead center position, the bottom ends of the clamp levers 13 are moved radially inwardly by the slide ring 151 of the member 15 so that an annular clearance is again formed between the top ends of the levers 13 and the friction ring 114.

The support sleeve 112 is also formed integral with a bracket having a bearing boss 5, which is vertically slidably fitted over a guide rod 4 supported at opposite ends by radial arms 3 extending from the main drive shaft 1. The roller 51 is mounted on the outside of the bearing boss 5 to run along guide rail 52 having a particular shape as seen in FIG. 10 to move the bearing boss 5 vertically along the rod 4 during its rotation about the main shaft 1.

The cake support 11 is in the form of a cylindrical box, the top wall 111 of which has an outer diameter slightly larger than that of cake A and is formed with a central aperture for receiving the pusher ring 191 of the upper head a together with wrapping net B. The supporting disc 11 is recessed to allow free rocking movement of the clamp levers 13.

An outer tube 17 includes a thin-walled cylindrical body portion 171 having an inner diameter slightly larger than the outer diameter of the cake support 11, and a tubular sleeve portion 172 depending from the body portion 171. The tubular sleeve 172 is fitted over the lever actuating member 15 for vertical sliding movement and externally carries the roller 173 arranged to run along the guide rail 174 to vertically move the outer tube 17.

A net opener 16 includes, as illustrated in FIG. 8, several radially arranged resilient strips 161 which diverge upwardly and are secured to a support sleeve 162. The strips 161 are resiliently bent radially inwardly when drawn into the inner tube 12 and flare out under their own resiliency when raised beyond the inner tube 12. The support sleeve 162 is vertically slidably fitted in the inner tube 12 and carries the roller 163 arranged to run along the guide rail 164 to effect vertical movement of opener 16 relative to the inner tube 12.

The upper head a of each of the wrapping units will next be described with reference to FIGS. 1, 2 and 9A to 9J.

The upper head a includes a pointed tube 18 having an inverted conical head 181 at its bottom and an axial bore 183 as a passage for compressed air extending through the entire length of the tube. A flexible air pipe 24 extends from a compressed air distributor 23 to the top of the pointed tube 18. The air distributor 23 is supported by the bracket 233 mounted on top of the main shaft 1 and connected to an appropriate source of compressed air. The air distributor 23 includes a compressed air supply box 231 and a compressed air receiver box 232. The air supply box 231 is a stationary cylindrical box having an opening 231′ formed in its side wall and having a limited circumferential extent. The air receiver box 232 is an annular box fixed to the main shaft 1, the inside of said box being divided by partitions 232″ into a number of compartments corresponding in number to the wrapping units installed in the machine. Formed in the inner peripheral wall of the receiver box 232 are openings 232′ one for each compartment. The air supply box 231 is sealingly fitted in the air receiver box 232. The air receiver box 232 carries outlet pipes 234, one for each compartment, secured to its outer peripheral wall and is rotatable with the main shaft 1 while maintaining sliding contact with the periphery of the air supply box 231.

Whenever any of the openings 232′ in the air receiver box 232 is brought into coincidence with the opening 231′ in the air supply box 231, compressed air from the source is directed through the associated outlet pipe 234 and further through flexible pipe 24 into the pointed tube 18 of the associated upper head a to be discharged downwardly at the bottom of the tube 18. As long as the opening 231′ is out of registry with any of openings 232′, the supply of compressed air to the wrapping units is interrupted. It will be understood that the jet of compressed air may be supplied, when required during operation to flare the top portion of the wrapping net B fitted in the associated lower head b, by properly determining the shape and size of the openings 231″ and 232′.

The pointed tube 18 is fitted in a support sleeve 19 and several wing plates 20 are pivoted to the outside of the sleeve 19 in a radial arrangement.

Each of the wing plates 20 has the form of a bell crank lever as shown in FIG. 6. The wing plate is formed on its outside with a projection 201 to be engaged by a clamp ring 22, which normally acts upon the wing plates 20 to urge their bottom ends inwardly in collective fashion above the top surface of the inverted conical head 181 of the pointed tube 18. The upper arms of the wing plates 20 are engaged externally by the bottom portion of a wing actuator ring 21. The wing actuator ring 21 is a cylindrical box-like member including an annular rim 211 for engagement with the wing plates 20, and a tubular top 212 fitted over the support sleeve 19 for vertical sliding movement. Roller 213 is mounted on the outside of the wing actuator ring 21 to run along guide rail 214 having a shape as shown in FIG. 10 for vertically shifting the wing actuator ring along the support sleeve 19.

When the wing actuator ring 21 is in its upper dead center position or at the top end of its vertical travel, the bottom ends of the wing plates 20 are collected together above the top of the conical head 181 of the pointed tube 18 for receiving the top of the wrapping net fitted in the lower head $b$. As the wing actuator ring is lowered, the top portions of the wing plates are moved radially inwardly so that their bottom ends are opened until the lower dead center is reached, whereat the wing blades 20 assume an upright position. If the ring 21 is subsequently raised, the top ends of the wing plates 20 are released to open under the bias of the clamp ring 22 and their bottom ends are again collected together so that the wing plates 20 together form a conical assembly to enable the wrapping net B to be smoothly fitted thereon.

The support sleeve 19 is a cylindrical member carried by a bracket arm 2 fixed to the main shaft 1 so as to be rotated in a horizontal plane. The sleeve 19 carries at the bottom the pusher ring 191 and a radial arrangement of pivot pins 192 on which respective wing plates 20 are mounted for pivotal movement.

The pusher ring 191 is a cylindrical member of a size to enter the clearance between the inner tube 12 and cake support 11 of the lower head $b$ to force the wrapping net B therein.

In operation, the wrapping units rotate about the main shaft 1 and the net B is inserted into the inner tube 12 at a particular station, as will be described hereinafter in more detail. The lower head $b$ with the net properly positioned therein is then bodily raised as the roller 51 proceeds along an upward spiral slope formed on the associated guide rail 52, moving the net B closer to the inverted conical head 181 on tube 18 until the lower head $b$ reaches the position shown in FIG. 9A. During this time, the upper head $a$ also rotates about the main shaft 1 and at a definite level, while being held in alignment with the lower head $b$. When the top of the wrapping net B is brought to a point near the head 181, compressed air from distributor 23 is blown out through the orifice in the tube bottom, when the openings 231' and 232' coincide with each other to allow air passage therethrough. The compressed air acts to flare the top of the net B as shown in FIG. 9B. The net B is further raised into a position covering the bottom of the pointed tube 18 when the valve openings 231' and 232' are moved out of coincidence with each other to interrupt the air flow thereby to terminate the flaring of the net. The flared net B continues to rise along the periphery of the pointed tube 18 and the wing assembly 20 to enwrap them from below (FIG. 9C).

At this point, the roller 213 on the upper head $a$ reaches a downward spiral slope formed on the associated guide rail 214 (FIG. 1) to lower wing actuator ring 21 thereby to move the bottom of the wing plates 20 radially outward. As a result, the upper half of the net B is opened to a cylindrical form having a diameter slightly larger than the outer diameter of the outer tube 17 of the lower head $b$. The roller 213 then proceeds to a low dwell portion of the guide rail 214 extending horizontally from the end of the down slope to hold the wing actuator ring 21 at the same level so that the wrapping net B is maintained in the fully open position for a certain length of time (FIG. 9D).

The lower head $b$ further continues to rise and the inner tube 12 and cake support 11 thereon approach the bottom of the pointed tube 18 and the wing assembly 20, respectively, of the upper head $a$ with the wrapping net B extending between the two heads. The inner tube 12 then forces the pointed tube 18 upwardly approaching pusher ring 191 mounted in the upper head $a$. On the other hand, the wrapping net B is spread over the top surface of the support 11 as the support 11 approaches the wing assembly 20 and the top portion of the net is finally folded down about the periphery of the outer tube 17. As shown in FIG. 9E, the net portion lying around the top rim of the inner tube 12 is forced by the pusher ring 191 into the annular space defined by the inner tube 12 and support 11 and further into the space between friction ring 114 mounted on the inner tube 12 and the clamp lever 13. At this point, as the roller 153 carried by the lower head $b$ proceeds along a down slope of the associated guide rail 154, ring 15 is caused to descend to release the bottom ends of the clamp levers 13 so that the levers 13 are allowed to clamp the net B forced in by the pusher ring 191 against the periphery of the ring 191 which in turn clamps the net against friction ring 114 under the action of clamping ring 14. Also, the net B previously turned down about the periphery of the outer tube 17 under the action of the wing plates 20 is finally held in close contact with the peripheral surface of the outer tube 17 and the top surface of the support 11 (FIG. 9E). The lower head $b$ is now at its highest level or top dead center.

The lower head $b$ is then lowered as roller 51 runs down a slope on the guide rail 52 and the pusher ring 191 previously held in the recess, defined by the inner tube 12 and support 11, is moved therefrom. The wrapping net B remains clamped between the friction ring 114 and clamp levers 13 in a V-shaped folded section. On this occasion the wing assembly 20 is also moved away from its previous position encircling the outer tube 17 and as the roller 213 is moved along an up slope formed on the associated guide rail 214, the wing actuator ring 21 is raised to allow the wing assembly to close under the bias of clamping ring 22 until the bottom extremities of the respective wing plates 20 are brought together above the top surface of the conical head 181 of the pointed tube 18.

The lower head $b$ continues to descend to reach its lowest level or bottom dead center and rotates at the same level as the roller 51 runs along a horizontal section of the guide rail 52, until a cake A to be wrapped is placed on the cake support 11, as shown in FIG. 9F. At this point, however, the roller 51 reaches an upward slope of the guide rail starting to raise the lower head $b$ as a unit. At the same time, rollers 173, 121 and 163 on the lower head proceed along the respective upward slopes of the respective guide rails 174, 122 and 164 to cause the outer tube 17, inner tube 12 and net opener 16 to rise through the position in FIG. 9G to their respective upper dead center portions, as shown in FIG. 9I. It will be observed that the net B previously covering the outer tube 17 is forced up with the rise of outer tube 17 to be unfolded and cover the outside of the lower half of the cake A as shown in FIG. 9G.

On this occasion, the inner tube 12 is first lifted together with the net opener rod 16 so that the net B previously extending into the depth of the inner tube 12 is pushed up while being turned inside out until the bottom end of the net is raised this time to form the top end thereof. During the time when a portion of the net B still remains inside of the top portion of inner tube 12 (FIG. 9G), roller 153 starts to proceed along an up slope of the guide rail 154 to raise the lever actuating ring 15 to allow the top ends of the clamp levers to release the net B previously held against the friction ring 114. The net B is thus allowed to be drawn by the rising inner tube 12 to be fully extended upwardly outside thereof from the inner peripheral edge of the cake bottom.

At this point, roller 121 enters a down slope of the guide rail 122 and the inner tube 12 starts to descend but the net opener rod 16 continues to rise to extend beyond the inner tube 12 while expanding radially outwardly to flare the top portion of the net B. Then, the net opener rod 16 starts to descend as roller 163 runs along a down slope of the guide rail 164. At this time, it is to be understood that the lower head b assumes a position adjacent to the upper head a. The bottom end of the pointed tube 18 in the upper head a is slowly inserted into the upper half of the wrapping net B, which finally envelopes the lower half of the wing plates 20.

Subsequently, as the roller 213 proceeds along a downward slope of the guide rail 214, the wing actuator ring 21 is lowered, as shown in FIG. 9I, to expand the upper half of the wrapping net B covering the wing plates 20 to form a cylindrical shape for nut B with a diameter slightly larger than the outer diameter of the cake A in the same manner as when the net B is expanded before the cake A is fed. Simultaneously, the lower head b is further raised so that the cake A, the lower half periphery of which has previously been covered by the net B as illustrated in FIG. 9G, is covered by the net over the entire outer periphery. In greater detail, the net B expanded by the wing plates 20 gradually covers the top surface of the cake A being raised and is turned over the outer periphery thereof. On this occasion, as the roller 173 proceeds along a down slope of the guide rail 174, the outer tube 17 of the lower head b is lowered to expedite the final stage of the wrapping operation. Then the roller 51 entering its down slope starts to lower the the lower head b with the cake A completely enwrapped.

On the other hand, as the wrapped cake A is moved downwardly away from the upper head a, the roller 213 thereon now entering an up slope of the guide rail acts to raise the wing actuator ring 21 to allow the wing plates 20 to be closed above the top of the conical head 181 of the pointed tube 18 to restore the starting position of the wrapping unit.

It is to be understood that the outer tube 17, net opener rod 16 and inner tube 12 are each restored to their lower dead center positions before the lower head b reaches its lower dead center, and then the entire lower head b is turned at a definite level about the main shaft 1 for a certain angular travel as the roller 51 proceeds along a horizontal section of the guide rail 52. During this travel, the wrapping units is completed while it makes one revolu- and another wrapping net B is fed therein. As apparent from the foregoing, the wrapping operation on each of the wrapping units is completed while it makes one revolution about the main shaft 1.

Having described herein the wrapping operation of one wrapping unit, it will be apparent that the wrapping capacity of the wrapping machine can be increased as desired by increasing the number of such wrapping units used therein and further by raising their speed of rotation about the main shaft. In one practical embodiment of the present invention, it has been found that the time requirement for each wrapping operation is reduced to about 1/15 as compared with the conventional manual operation.

Though in the above description vertical movements of various components are obtained by use of rollers arranged to be carried about the central main shaft under the drive thereof to run along respective annular guide rails each having ramps with particular slopes, it will be apparent to those skilled in the art that such vertical movements may be obtained by any of other known methods. For instance, the rollers may be carried by chain drive means along endless guide tracks to effect vertical movement. Alternatively, pneumatic or oil hydraulic piston-cylinder assemblies may be arranged in place of the rollers and guide rails therefor so as to be operated at fixed stations. Also, other mechanical arrangements including cams and gearings may be utilized to obtain desired vertical movements.

The feed of nets and cakes to be wrapped to the wrapping units and removal of wrapped cakes therefrom may be effected manually or by any known mechanical means.

As apparent from the foregoing description, the present invention provides an apparatus adapted to perform the cake wrapping operation, which has previously been effected manually, by mechanical means involving only simple vertical and rotative movements, and the apparatus is accurate, rapid and uniform in operation and in quality of the finished products. Also, it only includes relatively simple and rugged mechanical structures and hence is inexpensive, highly durable and excellent in production capacity.

What is claimed is:

1. A wrapping unit for automatically wrapping tubular rayon cakes with corrugated protective nets comprising an upper mechanism including a support sleeve and a pusher ring at the lower end of said support sleeve, said ring having a diameter slightly smaller than the inner diameter of the cake, a plurality of wing assemblies pivotally connected to the outer periphery of the pusher ring and a wing actuator ring slidably mounted on the support sleeve and including a lower end portion for contacting the wing assemblies and pivotably moving the same between inward and outward positions; a lower mechanism arranged coaxially with said upper mechanism and including a tubular support sleeve, an inner tube slidably fitted in said support sleeve for receiving a corrugated net in cylindrical form and for pushing the corrugated net upwardly from the support sleeve, a net opener rod slidably mounted in said inner tube for lifting an end of the net from said inner tube, said opener rod including a plurality of resilient strips in the upper portion thereof for expanding the end of the net lifted from the inner tube, the wing assemblies being insertable into the expanded end of the net when in inward position and expanding said end to a widened cylindrical form when in outward position, an elevating sleeve slidably mounted on said tubular support sleeve and carrying a tubular lever actuating member in the upper portion thereof between a raised position and a lowered position, an outer tube constituted by a base portion slidably mounted on said elevating sleeve and a tubular portion having an inner diameter slightly larger than the outer diameter of the cake, a cake support connected to the top of said tubular support sleeve and slidably fitted in said tubular portion of the outer tube sleeve, a friction ring mounted on the top end of the inner tube and a clamp lever having a central portion pivotally supported on the under surface of said cake support and a lower portion enclosing said friction ring, said clamp lever being engageable by the tubular lever actuating member with the latter in the lowered position to clamp a portion of the net between itself and the friction ring and enable another portion of the net to be folded down over the outer tube, the outer tube being raisable to lift the folded over portion of the net and position it around a cake placed on the cake support; and a third mechanism for causing axial movements of said wing actuator ring, tubular support sleeve, inner tube, net opener rod, elevating sleeve and support sleeve in a predetermined time relation such that a first end portion of the corrugated net is expanded by the wing assemblies and folded down over the outer tube after which the outer tube is raised and the folded over portion is positioned around a cake placed on the cake support whereafter the other end portion of the corrugated net is pushed from the support sleeve by the inner tube and turned inside out, thereafter expanded by the net opener rod and then widened by the wing assemblies inserted therein and moved outwards after which the upper and lower mechanisms are moved towards one another so that the widened end of the net is folded down over the cake and over the already folded end of the net, the upper and lower mechanisms then moving to their original upper and lower positions for resumption of operation with another net and another cake.

2. A wrapping unit for automatically wrapping rayon cakes with corrugated protective nets according to claim 1, wherein the wrapping unit is supported for rotation about a main shaft and said third mechanism includes a roller upstanding from the wing actuator ring, a roller at the lower portion of the net opener rod and projecting outwardly through vertical slots formed in the side walls of the tubular support sleeve and the inner tube, a roller at the lower portion of the inner tube and projecting outwardly through said vertical slot in said tubular support sleeve, a roller at the lower portion of the elevating sleeve, a roller at the lower portion of the support sleeve, a roller at the lower portion of the tubular support sleeve and guide rails arranged about the main shaft for supporting the respective rollers, said guide rails being shaped to produce respective vertical movement of the associated elements as the corresponding rollers move in the guide rails.

3. A wrapping unit for automatically wrapping rayon cakes with corrugated protective nets according to claim 1, comprising a tube for compressed air in the support sleeve of the upper mechanism, and a conical nozzle at the lower end of said air tube for blowing compressed air therethrough and into the cylindrical net to produce a flare therein enabling insertion of the wing assemblies therein.

References Cited

UNITED STATES PATENTS

| | | | |
|---|---|---|---|
| 2,436,481 | 2/1948 | McDermott | 53—204 |
| 2,615,606 | 10/1952 | McDermott | 53—204 |
| 2,692,464 | 10/1954 | Thompson | 52—204 |
| 2,774,202 | 12/1956 | Henry | 53—13 |

GRANVILLE Y. CUSTER, JR., *Primary Examiner.*